Oct. 31, 1950     M. C. CARBONARO     2,527,703
APPARATUS FOR DISPENSING LIQUIDS OR GASES

Filed Jan. 23, 1939                           3 Sheets-Sheet 1

INVENTOR
M. C. Carbonaro
BY
E. F. Wurdroth
ATTORNEY

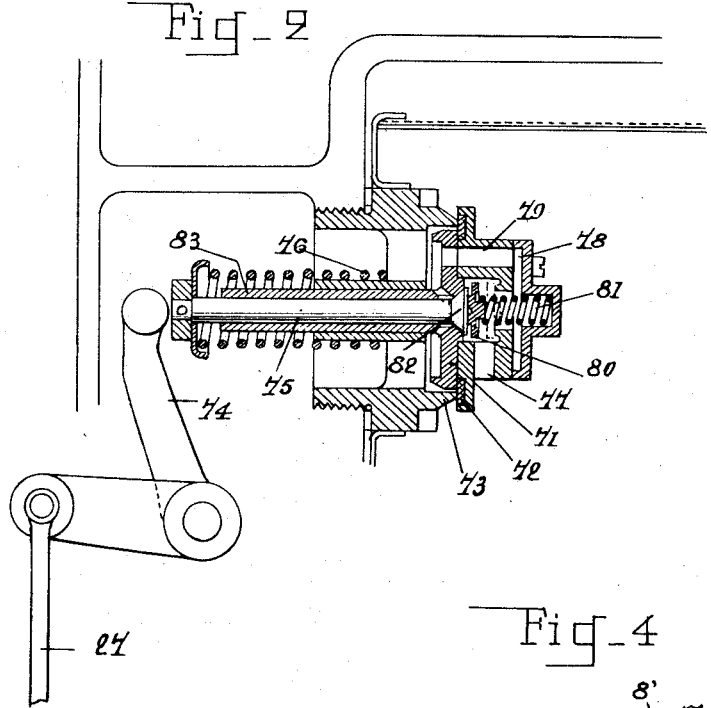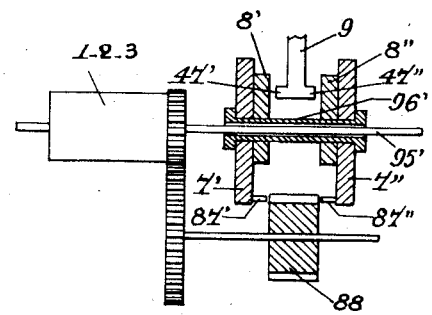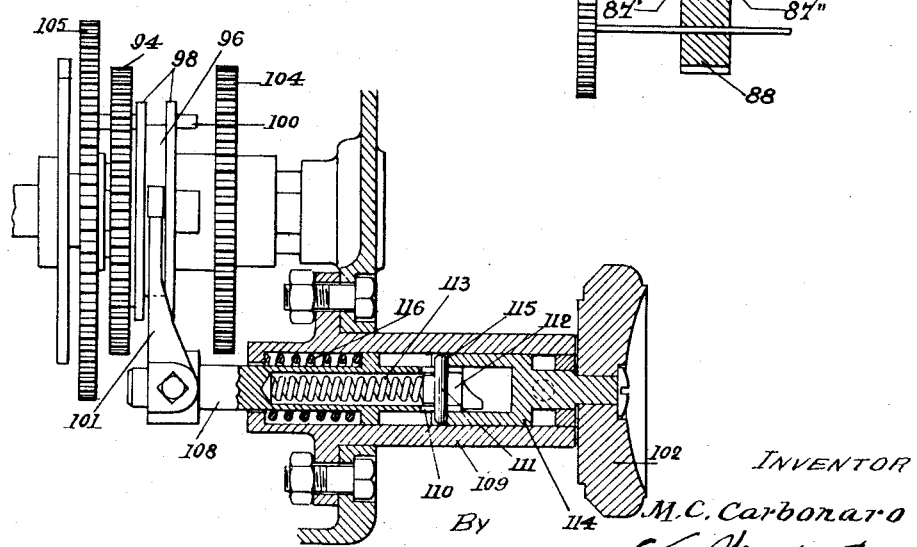

Oct. 31, 1950  M. C. CARBONARO  2,527,703
APPARATUS FOR DISPENSING LIQUIDS OR GASES

Filed Jan. 23, 1939  3 Sheets-Sheet 3

INVENTOR
M. C. Carbonaro

BY E. F. Wenderoth
ATTORNEY

Patented Oct. 31, 1950

2,527,703

UNITED STATES PATENT OFFICE 2,527,703

APPARATUS FOR DISPENSING LIQUIDS OR GASES

Marius Clément Carbonaro, Paris, France, assignor to Societe Anonyme Pour Tous Appareillages Mecaniques, Seine, France Application January 23, 1939, Serial No. 252,491
In France January 25, 1938

Section 3, Public Law 690, August 8, 1946
Patent expires January 25, 1958

7 Claims. (Cl. 222—20)

The present invention relates to apparatus for distributing liquids and gases (hereinafter, only liquids will be mentioned, but the invention is equally well applicable to the distribution of gases as of liquids), in which a volume register and a price register respectively indicate the quantity and the price of the liquid actually delivered at each distributing operation.

It is advantageous, in particular in order to facilitate the work of the person who is operating the apparatus and the distribution of the exact quantity asked for by the customer, to provide means for automatically stopping the distribution as soon as the quantity of liquid asked for has actually been distributed. This problem has been solved, in apparatus which only have a volume register, by associating with the latter a predetermining device on which the quantity to be delivered is marked before the distribution is effected and which stops the distribution as soon as it has been driven back to zero by the register. For solving this problem in apparatus provided with a price register and a volume register, the first solution which suggests itself consists in providing a predetermining device associated with the volume register and a predetermining device associated with the price register. This solution requires two predetermining meters, one for the quantities, another for the prices and a control mechanism for the valve for the inlet of liquid to the apparatus, which mechanism has to be capable of being actuated by either of the two predetermining devices.

The present invention enables the number of predetermining devices to be reduced to one, and consequently the control mechanism for the aforesaid valve to be simplified.

According to the invention, between the single predetermining device and the two price and volume registers, is interposed a transmission mechanism which enables the predetermining device to be engaged with one of the registers and at the same time said predetermining device to be disengaged from the other register.

In general, said transmission mechanism is adapted to act on the predetermining device by means of the cam secured to the lower order drum of the predetermining device, called quick cam.

In a first embodiment, the quick cam is driven by one or other of the registers by means of a sliding sleeve which is brought into engagement either with a pinion driven by the price register, or with a pinion driven by the volume register.

Preferably, said sliding sleeve engages with one or the other of said pinions by means of a toothed clutch device and is controlled by a member, which can be actuated from the outside, by means of an elastic transmission, so that in the event of the teeth not being in register with the recesses at the instant when the clutch is to be engaged, the sleeve which is resiliently pressed on the pinion can slip on same until the teeth encounter the first recesses.

In a second embodiment, the quick cam is divided into two identical parts, each of the same being secured to a pinion driven by one of the registers, the two groups which are each formed by the cam and the pinion being mounted on a sliding sleeve and being adapted to be brought into register with a lever which normally co-operates with the quick cam and opposite a carrying device for the lower order drum of the predetermining device.

The predetermining device, which is responsible for the accuracy of the quantity of liquid distributed, has in practice, owing to the amount of the unit price of the liquid, to rotate much faster in the case of a distributor involving predetermination by price than in the case of a distributor involving predetermination by quantity.

In order to prevent this too fast a rotation of the predetermining device from causing errors, I have arranged for the delivery of the liquid to be retarded towards the end of the distributing operation, by closing the valve for the inlet of the liquid into the apparatus in two stages, the valve being first partially closed during the first stage, and the closing of same completed during the second stage.

I obtain the closing of the valve in two stages in the following manner:

The first stage is determined by the instant when the teeth of a comb fall into the notches of the cams which are secured to the drums of the predetermining device, called slow cams, that is to say slightly before the quantity delivered is equal to the predetermined quantity, whereas the second stage is determined by the instant when a lever falls into the notch of a quick cam, that is to say at the instant when the quantity of liquid delivered is absolutely equal to the predetermined quantity of liquid.

In order to prevent the apparatus from being started before the predetermining device has completely returned to zero, I give the fast cam the shape of a cup, the cylindrical edges of which are provided with a notch and cooperate with a lateral abutment of the lever, which abutment is adapted to place itself inside the cup and fall into the notch, whence it can only be retracted when the notch has returned to a predetermined position.

Generally, the liquid does not flow into the apparatus simply by gravity and is forced into same by a pump. According to the invention, a switch which controls the operation of the pump is brought into the position corresponding to the stoppage of same at the instant when the valve is completely closed.

It is advantageous to use, for controlling the valve and the switch, the movements produced by the return of the predetermining device to zero and the movements for engaging said meter with one or other of the registers.

In particular, it is possible to use the movements of the mechanism which make independent of each other the members of the predetermining device which serve for the setting, on the one hand with respect to each other, and on the other hand of all the other members of the mechanism, thereby facilitating setting when the subsequent operation is effected.

It is necessary to provide for the possibility of stopping the delivery of the apparatus at any instant during the distribution, for example in the event of an overflow of the reservoir to be filled. For this purpose, I provide advantageously between a member actuated by the return of the predetermining device to zero and the switch, an escapement device and means actuated by an outside member of the distributor for causing the escapement of the arrangement to operate.

Finally, it is advantageous, in order to avoid an additional operation, to control the starting of the pump and the opening of the valve and the engagement of the various members of the predetermining device simultaneously by means of one and the same member actuated from outside the apparatus.

In the accompanying drawing, an embodiment of a distributor according to the present invention has been shown diagrammatically, by way of example. In said drawing:

Fig. 2 is a large scale section of the valve of said distributor in its closed position.

Fig. 3 is a detail of the distributor.

Fig. 4 is a modification in the actuation of the predetermining device by the registers.

Figure 1:
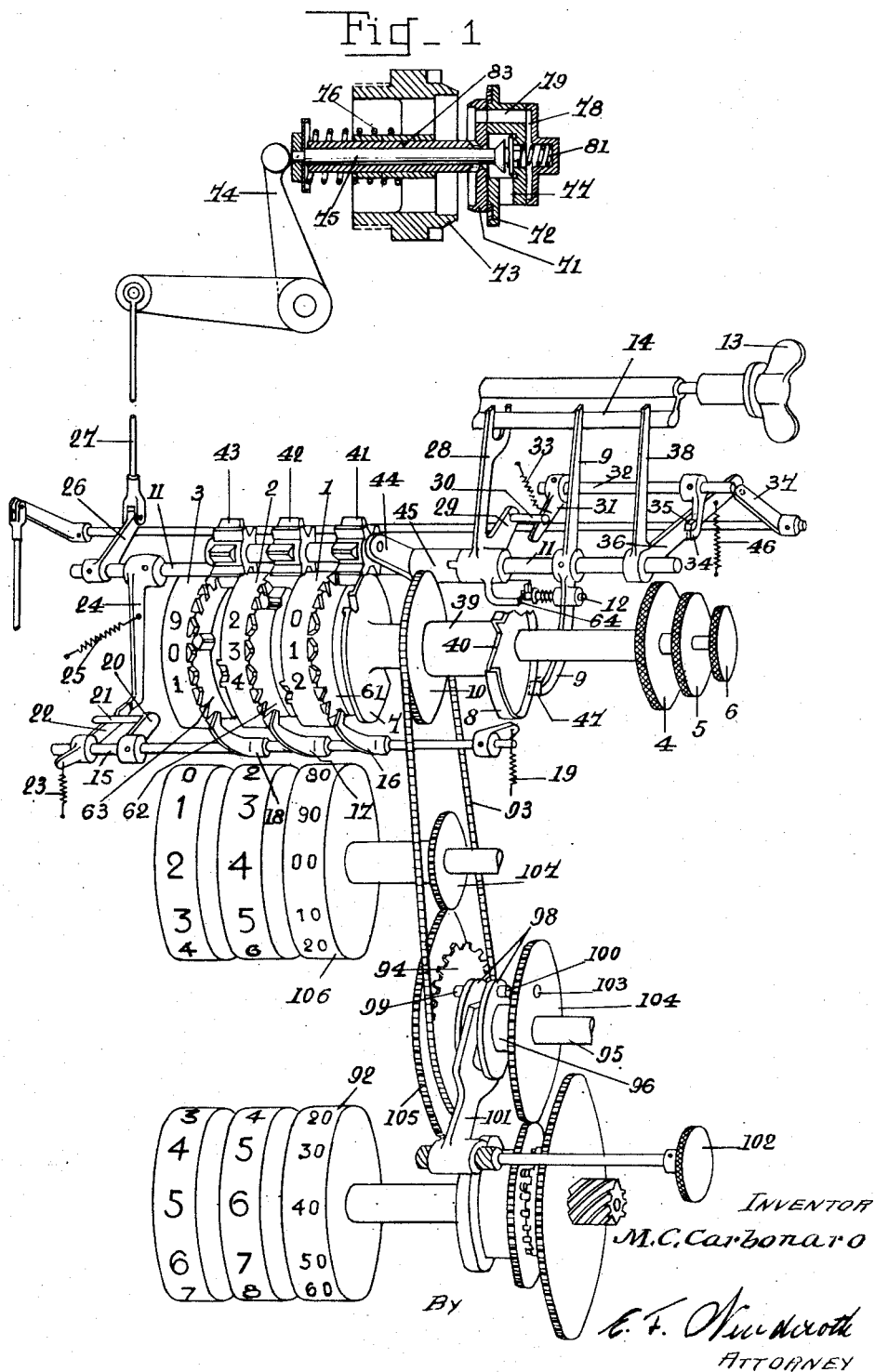
Fig. 1 is a partially perspective view of said distributor in the delivery position.
Figure 5:
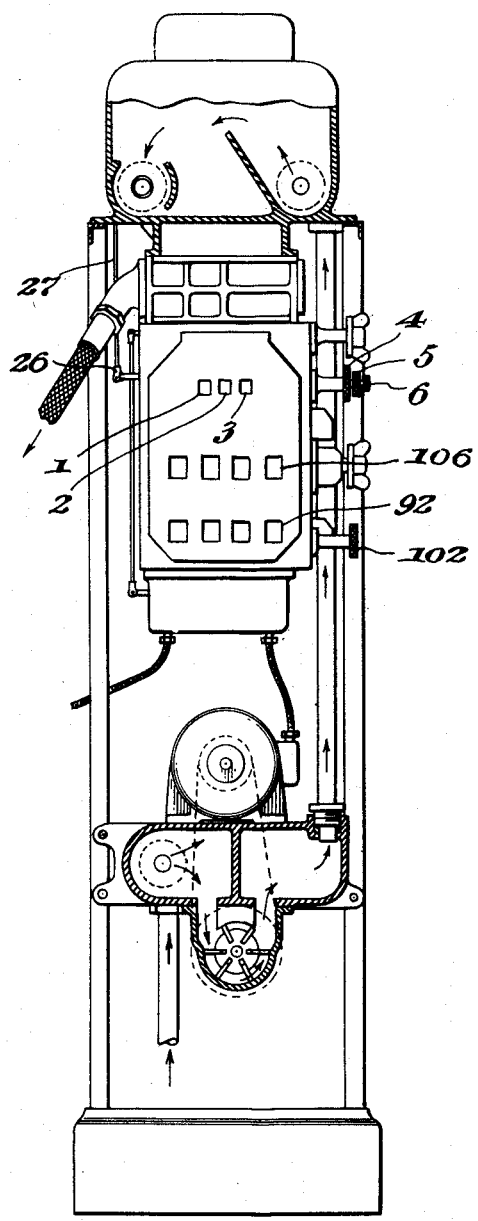
Figure 5 is a general assembly view of a liquid dispensing apparatus, constructed in accordance with an embodiment of the invention, showing certain parts in section.
Figure 6:
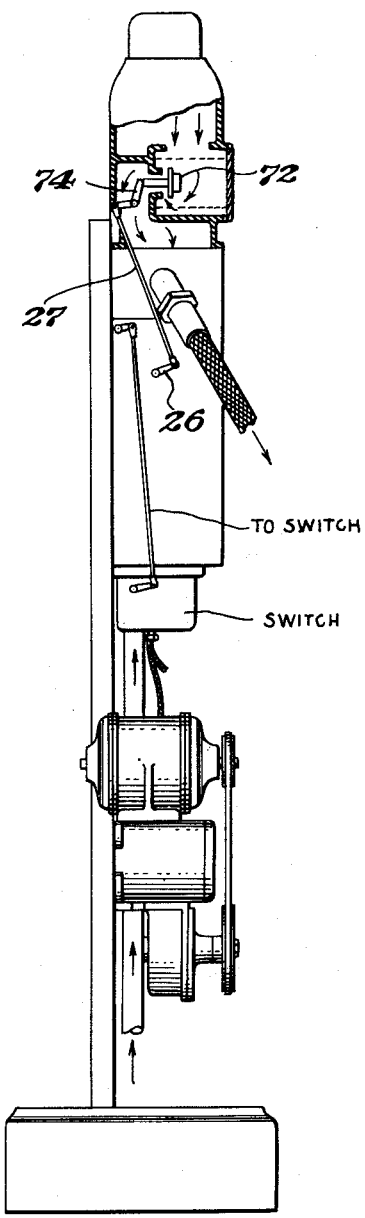
Figure 6 is a side view of Figure 5 with certain parts in section.

In the distributor illustrated, the predetermining device comprises three drums 1, 2, 3, which can be actuated by hand respectively by means of the knobs 4, 5 and 6 located outside the apparatus.

On the spindle of said drums and of said knobs, is arranged a sleeve 39 carrying a plate 7 provided with a dog, a toothed pinion 10 driven by the register and a cam 8, called fast cam. Said cam 8 is shaped like a cup, the cylindrical edges of which are provided with a notch 40. The drums 1, 2, 3 are driven, according to a known system, by the plate 7 through the intermediary of the transfer pinions 41, 42, 43. The drums 1, 2, 3 are respectively secured to a slow actuating cam 61, 62, 63; said slow cams co-operate with the teeth 16, 17, 18 of a comb which rotate together about a shaft 15. A spring 19 tends to urge the teeth 16, 17, 18 resiliently against the cams 61, 62, 63; each of said cams 61, 62, 63 is provided with a notch, in such a manner that when the teeth 16, 17, 18 have fallen into said notches, the drums 1, 2 and 3 are in the zero position. On the shaft 15 is keyed a crank 20, a tenon 21 of which cooperates with a lever 22 which is loosely mounted on the shaft 15 and is urged by a spring 23 in the opposite direction to the action of the spring 19 on the comb.

The transfer pinions 41, 42 and 43 are carried by two brackets 44 loosely mounted on a sleeve 45 carried by a shaft 11. Said sleeve 45 also carries a bell-crank lever 28, 29, the forked arm 28 of which cooperates with a locking plate 14 actuated by the control knob 13 of the distributor. The sleeve 45 carries a notched cam 64 which co-operates with a resilient push rod 12 carried by a lever 9 which is locked on the shaft 11. Said lever 9 carries a lateral abutment 47 which cooperates with the cylindrical edges of the cam 8 and which can penetrate into the notch 40. When said abutment 47 has penetrated into the notch 40, it passes under the cylindrical edges, and can only come out of same when the notch 40 returns to a predetermined position, thereby preventing a fresh setting being effected so long as the cam 8 has not returned to said position. The predetermined position of the notch 40, in which the lever 9 may enter or leave from the cylindrical portions of the cam 8 corresponding to the positions of the price register 92 and the volume register 106 in which the drums of the lower order are at zero. Therefore the lever 9 cannot leave or enter into the cam 8 except when the first drum of the register connected therewith is at zero. Said shaft 11 also carries a crank 24, the end of which cooperates with the lever 22 and a spring 25 tends to rotate the shaft 11 in a clockwise direction. The shaft 11 also carries a crank 26, the free end of which is connected by a rod 27 to the supply valve of the distributor. The arm of the lever 9 which does not cooperate with the cam 8, bears against the plate 14. Another bell-crank lever 36, 38 is loosely mounted on the shaft 11; by means of its arm 38, it cooperates with the plate 14, whereas the end of its other arm 36 is connected to a switch by actuating means 37, and a spring 46 tends to urge the arm 38 against the plate 14. The arm 36 carries a projection 35 which cooperates with a crank 34 keyed on a shaft 32. The arm 34 is pushed under the abutment 35 by a spring 33 which acts on the shaft 32 by means of a crank 31 which cooperates with the tenon 30 of the arm 29 of the lever 28, 29.

The valve of the apparatus, which is shown in large scale section in Fig. 2, comprises a body 71 which bears, by means of a bearing surface 72 on a seat 73 of any appropriate shape; said valve is lifted by the action of a lever 74 or the like which acts on the valve-stem 75 that slides in a sleeve 83, against the action of a spring 76, its being moreover possible for the lifting of the valve to be effected by any other appropriate means. According to the invention, the valve body is provided with an auxiliary passage formed by the conduits 77, 78, 79, which can be closed by an auxiliary valve 80 normally held in the open position by a spring 81. Said auxiliary valve may, on the other hand, be actuated by the stem 75 which is adapted to bear on its front face.

The device thus constructed operates in the following manner: during the open period of the automatic valve, that is to say during the normal delivery of the distributor (Fig. 1), the lever 74 holds the valve open owing to its action on the stem 75, but at the same time the end 82 of said stem 75 bears the auxiliary valve 80 against its seat, in the position shown in Fig. 1 or in dotted lines in Fig. 2 and compresses the spring 81. At the instant when the main valve is closed, the stem 75 which is released is separated from the valve 80 by the action of the main spring 76, but instead of following said stem, the valve 80 remains pressed on its seat owing to the pressure which exists ahead and which prevails in the conduit 77. Said pressure subsists for a few moments after the closing, but gradually decreases simply by the effect of the inevitable leaks which exist between the members of the distributor. After a moment the force of the spring 81 becomes predominant and pushes back the valve 80 into the position shown in full lines in the drawing, thereby re-opening the passage by way of the conduits 77, 78, 79, through the valve body.

It is obvious that the particular arrangement of the valve 80 could be replaced by any other equivalent arrangement comprising a member which is sensitive to the pressure variations ahead of the main valve.

The predetermining device or drums 1, 2, 3 is driven by means of the volumetric meter not shown, either by the price register 92, or by the volume register 106, according to whether the predetermining device marks a price or a quantity. For this purpose, the pinion 10, which is secured to the sleeve 39, is driven by a chain 93 (said chain might advantageously be replaced by a set of gears) which receives its movements from a sprocket wheel 94. Said sprocket wheel 94 is secured to a sleeve 96 which is loosely mounted on the shaft 95. On said sleeve are also fixed two cheeks 98 carrying tenons 99 and 100. Between said cheeks is arranged a fork 101 which is resiliently actuated by a knob 102 controlled from the outside. By operating said knob, either the tenon 100 is brought into a hole 103 of a gear 104 actuated by the price register, only the three drums 92 of which have been shown, or the tenon 99 is brought into a hole, which is not visible in Fig. 1, of a gear 105 driven by the volume register, only the three drums 106 of which have been shown that drive the gear 105 by means of the gear 107.

This apparatus operates as follows:

According to whether it is desired to deliver a certain quantity or a certain value of liquid, the knob 102 is rotated in such a manner as to bring the tenon 100 or the tenon 99 into the corresponding hole of the gear 104 or 105. The sprocket wheel 94 is in this case driven either by the volume register, 106, or by the price register 92.

Assuming that the predetermining device is at zero and that it is required to deliver a quantity of liquid equal for example to 55 litres at 2 francs 35 centimes each. By means of the knob 102, the tenon 99 is brought into the hole provided in the gear 105, so as to enable the volume register to bring the predetermining device 1, 2, 3 back to zero, and by means of the knobs 4, 5 and 6, the drums 1, 2 and 3 are successively rotated in such a manner that they show 55 (number of litres to be dispensed), its being possible to effect this operation in any order; this rotary movement causes a slight downward movement of the teeth 16, 17, 18 of the comb against the action of the spring 19 and consequently the crank 20 and its tenon 21 are raised. Under the action of the spring 23, the crank 22 follows the tenon 21. The end of the lever 24 is then located in front of the end of the lever 22.

If, after this setting operation, the operating knob 13 is rotated to its extreme position, the plate 14 is brought into the position shown, thereby causing the lever 9 to rock and having the effect:

(1) of bringing the end of the lever 9 out of the notch 40 of the fast cam 8, which is thus able to rotate.

(2) of causing the shaft 11 to rotate in spite of the action of the spring 25 in a counter-clockwise direction, of lifting the rod 27, of thereby causing the inlet valve to open full and furthermore of bringing the end of the lever 24 back behind the end of the lever 22, after having retracted the latter which returns to the position shown in the drawing responsive to the action of the spring 23. The lever 24 and the members which are secured to same are thus in a quite definite position, the tensioned spring 25 holding the levers 22 and 24 in contact with each other.

(3) of rocking the lever 28, of thereby causing the sleeve 45 to rotate together with the brackets 44, of bringing the transfer pinions 41, 42 and 43 into the position in which they mesh with the gears secured to the drums 1, 2 and 3.

(4) of rocking the levers 36, 38 against the action of the spring 46, of lifting the arm 36 and consequently the rod 37, thereby closing the switch. The electric current flows and the pump starts working.

(5) of lifting the arm 29, which has the effect of enabling the crank 31 to move upwards responsive to the spring 33 and bring the hook 34 under the abutment 35 and of locking the switch in the "on" position.

Consequently, this first operation is intended to start the motor and open the inlet valve.

As the distributor delivers liquid, the register rotates the toothed wheel 10 and consequently the plate 7 and, by means of transfer pinions 41, 42 and 43, the drums 1, 2 and 3 which are returned towards the zero position.

When all the drums have returned to the zero position, the combs 16, 17, 18 are lifted under the action of the spring 19 and penetrate into the notches of the corresponding cams, thereby rocking the lever 20 downwards and consequently causing the levers 22 and 24 to escape. Under the action of the spring 25, the shaft 11 tends to rotate in a clockwise direction, which has the effect of exerting a pull on the rod 27 and of partially closing the inlet valve. Furthermore, this rotation of the shaft 11 is limited by the contact of the lever 9 on the cam 8. Finally, this movement of the lever 9 causes the plate 14 to rock slightly.

When the notch 40 of the cam 8 comes opposite the end of the lever 9, as said lever is not supported, it falls into the notch 40 under the action of the spring 25, thereby causing a further rotation of the shaft 11 which has the effect:

(1) of causing the complete closing of the inlet valve owing to the pull exerted on the stem 27.

(2) of causing, through the intermediary of the push rod 12 and of the cam 64, the sleeve 45 to rotate, the brackets 44 to rock and consequently the transfer pinions 41, 42, 43 to become disengaged from the drums 1, 2 and 3. Thus the drums 1, 2 and 3 are made independent of each other and of the transfer gears.

(3) of causing, by rotating the sleeve 45, the arm 29 to swing downwards and consequently the crank 31 to be lowered, the hook 34 to escape from under the abutment 35 and the switch to close under the action of the spring 46 by the thrust of the rod 37.

This operation therefore causes the motor to stop and the inlet valve to close.

If it is desired to stop the delivery before the teeth 16, 17, 18 fall into the notches of the corresponding cams or even before the lever 9 falls into the notch 40, that is to say before the predetermined quantity of liquid is actually delivered (which may be necessary for instance if the reservoir to be filled were to overflow), it suffices to rotate the knob 13 in the suitable direction, the lever 28 will swing in a clockwise direction, which will be possible owing to the shape of the toothed cam 64 and of the resilience of the push rod 12. The lever 29 will lower the crank 31 and cause the hook 34 to escape from the abutment 35, and the switch will be opened by the action of the spring 46, since the lever 38 is no longer held by the plate 14.

It should be observed that the above described apparatus enables first of all the quantity of liquid asked for by the customer to be distributed (in the present case 55 litres), then an additional quantity such that the price of the quantity asked for (in the present case 129 Frs. 25) plus the price of the additional quantity (for instance 20 Frs. 75) make a round figure, thereby avoiding or facilitating the giving of change by the person who is operating the distributor. In the present case, the customer has to pay 150 Frs.

This method of procedure is possible owing to the resilient drive of the tenons 99 and 100 by the knob 102. Said drive is obtained in the present case in the following manner:

The fork 101 is fixed on a rod 108 which slides without rotating in a bush 109 which is fixed on the frame of the apparatus and is provided at its end with a slot 110 in which can move a key 111 carried by a part 112 which slides freely in the hollow part of the rod 108. A spring 113 placed in said hollow part tends to urge the key 111 out of the slot 110, which is impossible owing to the presence of a bush 114 which is secured to the knob 102 and has an end 115 forming a slope. A spring 116 tends to urge the rod 108 towards the right.

Said drive can be used in the following manner:

The customer having asked for 55 litres, the 55 litres asked for are delivered to him. The price shown by the price register 92 is 129.25 francs. He tenders a one hundred franc note and a fifty franc note to the person operating the distributor. As the person does not possess any change and the customers reservoir is not full, said person suggests delivering him a quantity of gasoline, corresponding to 150 francs minus 129.25 francs, i. e., 20.75 francs. The customer accepts. Under these conditions, the person in question by means of the buttons 4, 5 and 6 leads the drums of the predetermined arrangement 1, 2 and 3 in such a manner as to indicate upon them the number 20 (difference between the delivery bills: 150 francs and the price of the liquid dispensed in round numbers about 130 francs) and one leads the button 102 from the volume position (position in which the volume register 106 is connected with the predeterminator 1, 2, 3) into its price position (position in which it brings about a connection of the price register 92 with the predeterminator) under these conditions responsive to the spring 116, the rod 108 and consequently the fork 101 are brought towards the right. The tenon 100 bears on the left face of the gear 104. Owing to the fact that the quantity of 55 litres delivered does not correspond to a whole number of francs, there will not be a hole located opposite said tenon. Delivery will be started by rotating the knob 13, the tenon 100 will slip on the face of the gear 104 which rotates without driving the predetermining devices 1, 2, 3. At the instant when it is located opposite the hole 103, the tenon 100 falls into same under the action of the spring 116 and thenceforth drives the predetermining device 1, 2, 3, until the instant when same has returned to zero and stops the delivery. The customer will then have received a quantity of liquid corresponding to 150 francs and will not have to receive any change.

It is obvious that it is also possible to deliver, after a quantity of liquid corresponding to a price shown on the predetermining device 1, 2, 3, an additional quantity of liquid which will be marked on the predetermining meter 1, 2, 3.

The present invention is not limited to the apparatus described. Thus, for instance, the driving device for the predetermining device 1, 2, 3 on the registers may be constructed as shown in Fig. 3. The fast cam 8 of the apparatus shown in Fig. 1 is divided into two identical parts 8' and 8'' and the pinion 7 is replaced by two pinions 7' and 7''. The pinions 7' and 7'' are respectively driven by the price and volume registers. The cam 8' is juxtaposed to the pinion 7' and the cam 8'' to the pinion 7''. The cams 8' and 8'' are carried by a sleeve 96' which is loosely mounted on the shaft 95 of the predetermining device and is controlled by the knob 102. The lever 9 is provided with two lateral abutments 47' and 47''. The pinions 7' and 7'' respectively carry a dog 87' and 87'' driving the lower order drum 1 of the predetermining device through a satellite 88.

According to whether a quantity of liquid estimated in money or in volume is delivered, the sleeve 96 is moved in such a manner as to bring the abutment 47' or 47'' into cooperation with the cam 8' or 8'' and then bring the transfer pinion 88 on to the path of the dog 87' or 87''.

I claim:

1. A distributing apparatus for a liquid or a gas comprising a volumetric meter, a price register, a volume register, a single predetermining device, means operated by said volumetric meter for operating said registers, a gearing arrangement comprising a driven element connected to said predetermining device and two driving elements, means controlled by said price register for operating one of said driving elements, means controlled by said volume register for operating the other of said driving elements and elastic means for connecting said driven element with one of said driving elements while simultaneously disconnecting said driven element from the other of said driving elements.

2. A distributing apparatus for a liquid or a gas comprising a volumetric meter, a price register, a volume register, a predetermining device, means operated by said volumetric meter for operating said registers, a gearing arrangement comprising a driven element connected to said predetermining device and two driving elements, means controlled by said price register for operating one of said driving elements, means controlled by said volume register for operating the other of said driving elements, means for connecting said driven element with one of said driving elements while simultaneously disconnecting said driven element from the other of said driving elements and a cam fixed to said driven element coacting with said predetermining device for controlling the liquid distributed.

3. A distributing apparatus for a liquid or a gas comprising a volumetric meter, a price register, a volume register, a predetermining device, means operated by said volumetric meter for operating said registers, a gearing arrangement comprising a driven element connected to said predetermining device and two driving elements, means controlled by said price register for operating one of said driving elements, means controlled by said volume register for operating the other of said driving elements, means for connecting said driven element with one of said driving elements while simultaneously disconnecting said driven element from the other of said driving elements, said driving elements each comprising a disc having a hole therein and said driven element being located between said two discs and carrying upon each of its faces a projection and elastic means for connecting said driven element with one of said driving elements.

4. A distributing apparatus for a liquid or a gas comprising a volumetric meter, a price register, a volume register, a cam, a predetermining device having a plurality of drums, means for mechanically connecting said cam to one of said drums, means operated by said volumetric meter for operating said registers, a valve controlling the flow of liquid or gas in the apparatus, means controlled by said predetermining device for completely closing said valve, a pump for circulating the liquid or gas in the apparatus, means for stopping said pump controlled by said predetermining device said means for closing said valve and said means for stopping said pump having a common element controlled by said cam and said cam having the form of a cup whose cylindrical edges are provided with a notch and a lateral abutment upon said common element cooperating with said notch.

5. A distributing apparatus for a liquid or a gas comprising a volumetric meter, a price register, a volume register, a predetermining device, having drums, means operated by said volumetric meter for operating said registers, a valve controlling the flow of liquid or gas in the apparatus, means controlled by said predetermining device for completely closing said valve, a pump for circulating the liquid or gas in the apparatus, means for stopping said pump controlled by said predetermining device, means for closing said valve partially, said means comprising a comb coacting with cams each integral with one of the drums of the predetermining device, an escapement mechanism controlled by said comb and elastic means liberated by the escape of said escapement mechanism and controlling said valve.

6. A distributing apparatus as claimed in claim 4, in which said means for stopping said pump comprise a coupling assembly and a member located outside of the apparatus for disconnecting one of the elements of said assembly from the other.

7. An apparatus as set forth in claim 4 in which said means for stopping said pump comprises a coupling assembly, one of the elements of said assembly being controlled by said predetermining device while the other element of said coupling assembly has the form of a cam, a lever integral with said cam, a control member located outside of the apparatus, a member controlled by said control member and said lever having at least one point thereof located within the path of movement of said last-named member.

MARIUS CLÉMENT CARBONARO.

REFERENCES CITED

The following references are of record in the file of this patent:

UNITED STATES PATENTS

| Number | Name | Date |
| --- | --- | --- |
| 1,724,429 | Shield | Aug. 13, 1929 |
| 1,759,396 | Granberg | May 20, 1930 |
| 1,888,533 | Jauch | Nov. 22, 1932 |
| 1,948,984 | Granberg | Feb. 27, 1934 |
| 2,046,304 | Brubaker et al. | June 30, 1936 |
| 2,056,923 | Hanford | Oct. 6, 1936 |
| 2,099,129 | McMullen | Nov. 16, 1937 |
| 2,116,785 | Griffith | May 10, 1938 |
| 2,180,821 | Ginnel | Nov. 21, 1939 |
| 2,227,830 | Hazard | Jan. 7, 1941 |